US012738695B2

(12) United States Patent
Kopp et al.

(10) Patent No.: US 12,738,695 B2
(45) Date of Patent: Sep. 15, 2026

(54) FIELD DEVICE

(71) Applicant: Endress+Hauser SE+Co. KG, Maulburg (DE)

(72) Inventors: Daniel Kopp, Lörrach (DE); Hansjörg Brock, Grenzach-Wyhlen (DE); Martin Kropf, Steinen (DE); Alexander Meinhardt, Lörrach (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 387 days.

(21) Appl. No.: 18/565,242

(22) PCT Filed: May 18, 2022

(86) PCT No.: PCT/EP2022/063470
§ 371 (c)(1),
(2) Date: Nov. 29, 2023

(87) PCT Pub. No.: WO2022/253577
PCT Pub. Date: Dec. 8, 2022

(65) Prior Publication Data

US 2024/0266784 A1 Aug. 8, 2024

(30) Foreign Application Priority Data

Jun. 1, 2021 (DE) ..................... 10 2021 114 221.0

(51) Int. Cl.
*H01R 13/648* (2006.01)
*H01R 13/187* (2006.01)
(Continued)

(52) U.S. Cl.
CPC ....... *H01R 13/6485* (2013.01); *H01R 13/187* (2013.01); *H01R 13/53* (2013.01); *H01R 13/521* (2013.01)

(58) Field of Classification Search
CPC ....... H05K 7/14; H05K 9/0064; H05K 7/1462
(Continued)

(56) References Cited

U.S. PATENT DOCUMENTS 4,752,253 A * 6/1988 Neumann .............. H01R 13/05 439/825
4,927,367 A * 5/1990 Salvagno ............ H05K 9/0039 439/97
(Continued)

FOREIGN PATENT DOCUMENTS

CN 205264436 U * 5/2016

*Primary Examiner* — Tulsidas C Patel
*Assistant Examiner* — Thaslimur Rahman
(74) *Attorney, Agent, or Firm* — Mark A. Logan; Endress+Hauser (USA) Holding, Inc.

(57) ABSTRACT

A field device having a non-metallic housing and electrical components accommodated in a Faraday cage includes an electrically conductive pin to ground the cage. For this purpose, the housing includes a bushing into which the pin can be inserted along an axis. The housing and the cup are arranged relative to each other such that the receiving region of the cup for the end of the pin is aligned with the bushing along the insertion axis. The field device includes an electrically conductive spring that resiliently encloses the end of the pin in the receiving region radially with respect to the insertion axis such that the pin is electrically contacted with the cup. A particular advantage of this design is that the pin cannot tilt during insertion despite any component tolerances of the cup or of the housing.

10 Claims, 1 Drawing Sheet

(51) Int. Cl.
*H01R 13/53* (2006.01)
*H01R 13/52* (2006.01)

(58) Field of Classification Search
USPC .......................... 361/178; 439/607.1, 95–100
See application file for complete search history.

(56) References Cited

U.S. PATENT DOCUMENTS

| | | | | |
|---|---|---|---|---|
| 2010/0203748 | A1* | 8/2010 | Wason | H01R 4/64<br>439/98 |
| 2017/0201661 | A1 | 7/2017 | Conger | |
| 2018/0160574 | A1 | 6/2018 | Michalski et al. | |

* cited by examiner

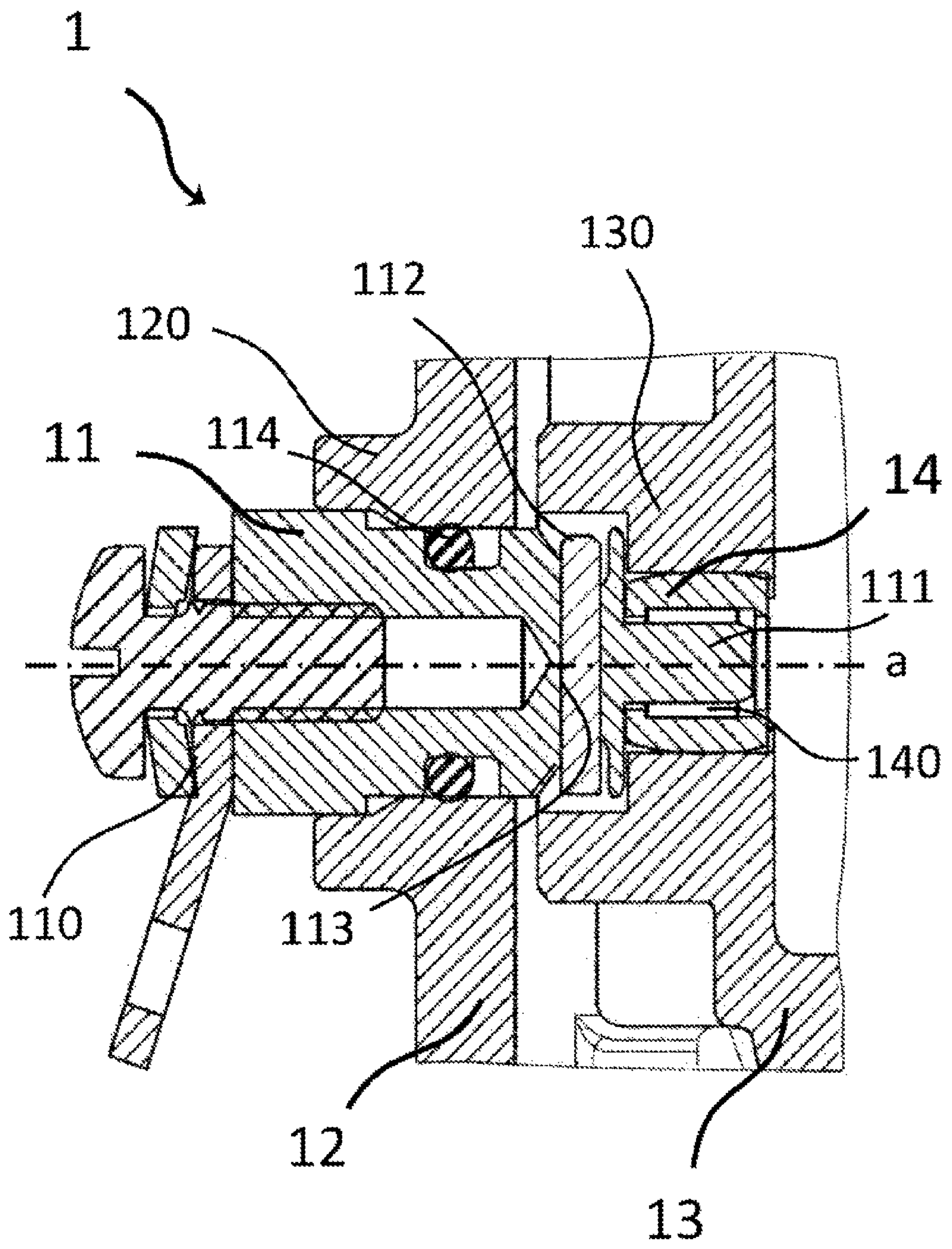
1
130
112
120
11
114
14
111
a
140
110
113
12
13

FIELD DEVICE

CROSS-REFERENCE TO RELATED APPLICATIONS

The present application is related to and claims the priority benefit of DPMA Patent Application No. 10 2021 114 221.0, filed on Jun. 1, 2021, and International Patent Application No. PCT/EP2022/063470, filed May 18, 2022, the entire contents of which are incorporated herein by reference.

TECHNICAL FIELD

The invention relates to a corrosion resistant field device, having an insertion connection for grounding the electronic components of the field device.

BACKGROUND

In process automation technology, field devices are often used to record or influence certain process variables. In order to record the respective process variable, the field device comprises, depending on the type, specific electronic components to implement the corresponding measuring principle. Depending upon the design, the respective field device type can thus be used, for example, to measure a fill-level, a flow rate, a pressure, a temperature, a pH value, and/or a conductivity. A wide variety of such field devices is manufactured and distributed by the Endress+Hauser corporate group.

The electronic components of the respective field device type are often accommodated in a metal housing that serves as a Faraday cage to protect the components and is correspondingly grounded. However, there are also applications in which a non-metallic housing is advantageous or required. For example, field devices that are used under corrosive conditions, such as offshore sites, and in processes with acidic or alkaline media, are preferably based on a plastic-based housing. In such cases, the electronic components are protected by an additional, electrically conductive cup that acts as a Faraday cage and is arranged together with the electronic components in the plastic-based housing.

In the non-metallic design of the field device housing, the grounding of the electronic components or of the cup is made more difficult, because the corresponding grounding pin must pass through the plastic housing. In this case, it is particularly problematic that the corresponding pin bushing in the housing must be exactly aligned with the corresponding pin receiving region of the cup. However, due to component tolerances, this cannot be implemented at an economically acceptable cost. Any component tolerances can thus cause the pin to tilt, resulting in inadequate grounding.

SUMMARY

The invention is therefore based on the object of providing a field device having a non-metallic housing, the electronic components of which can be grounded.

This object is achieved by a field device comprising the following components:

- an electrical pin, having:
  - a cable connection; and
  - an end pin opposite the cable connection;
- a device housing that, for example, is made of an electrically insulating material for corrosion protection purposes;
  - a bushing into which the pin can be inserted along an insertion axis;
- a cup made of an electrically conductive material such as aluminum, which cup can be arranged in the housing and functions as a Faraday cage for electronic components of the field device, having:
  - a receiving region that is aligned with the bushing of the housing with respect to the insertion axis in such a way that the end pin of the pin terminates in the receiving region.

The field device according to the invention is characterized by an electrically conductive spring element that encloses the end pin in the receiving region at least radially or additionally also resiliently with respect to the insertion axis in such a way that the cup is electrically connected to the pin.

In principle, it is not fixedly prescribed how the spring element is designed, as long as it is radially resilient and electrically conductive. For this purpose, the spring element can be configured, for example, as a sleeve corresponding to the end pin, which sleeve has at least three elastically or plastically deformable inner lamellae. In this case, the lamellae can be arranged axially, or radially circumferentially, with respect to the insertion axis. For reasons of elastic or plastic deformability, it is advantageous if the sleeve is made of copper, a copper-beryllium alloy, or brass. As an alternative to the realization as a sleeve, the spring element within the scope of the invention can also be configured as an annular spring or a wave spring corresponding to the end pin. Regardless of the design of the spring element, it is advantageous to minimize the contact resistance if the spring element comprises a gold coating.

It is advantageous if the housing forms an end stop for the pin in the direction of the insertion axis in such a way that the end pin of the pin automatically terminates in the receiving region or in the spring element when the end stop is reached. Moreover, it is appropriate if the field device comprises a securing cotter pin that axially secures the pin against pulling out. For this purpose, a bushing corresponding to the cotter pin is required in the pin, which bushing extends orthogonally to the insertion axis in the housing.

Based on the following method steps, the field device according to the invention can be manufactured according to one of the preceding embodiments:

- inserting the spring element into the receiving region of the cup;
- subsequently inserting the cup into the housing in such a way that the receiving region or the spring element is aligned with the bushing with respect to the insertion axis;
- inserting the pin into the bushing from an outer side of the housing remote from the cup in such a way that the end pin is radially and optionally axially resiliently enclosed by the spring element with respect to the insertion axis, and in such a way that the pin is electrically contacted with the cup; and
- axially securing the pin against pulling out by inserting the pin into the cotter pin bushing, provided that a securing cotter pint is provided.

BRIEF DESCRIPTION OF THE DRAWING

The present disclosure will be explained in more detail with reference to the following FIGURE:

FIG. 1 shows a detail of the field device according to the present disclosure in the region of a grounding connection.

DETAILED DESCRIPTION

For an understanding of the invention, a cross-sectional view of a field device 1 in the region of a grounding connection according to the invention is shown in FIG. 1. In order to realize corrosion resistance, for example, the field device 1 comprises a plastic-based housing 12 that is manufactured, for example, from PP, PE or PU. The electronic components of the field device 1 (not explicitly shown in FIG. 1) are protected by an additional cup 13, which acts as a Faraday cage. The cup 13 is in turn arranged in the interior of the housing 12.

In order for the cup 13 to act as a Faraday cage, it is made of an electrically conductive material such as aluminum. In order to ground the cup 13, a metal-based pin 11 and a cup-side receiving region 130 for a corresponding end pin 111 of the pin 11 is provided as a component of the grounding connection so that the cup 13 can be electrically contacted or grounded via the pin 11. In this case, the pin 11 is to be configured with a corresponding diameter of, for example, at least 6 mm to ensure the required conductivity. In the embodiment shown, the pin 11 comprises a crimp connection for cable strands or open cable ends as a cable connection 110 for connecting a grounding cable. In this case, the cable connection 110 on the pin 11 is opposite the end pin 111 and thus remains outside of the housing 12 in the inserted state. In order to be able to feed the pin 11 to the cup 13 or the receiving region 130 thereof from the housing exterior, a bushing 120 positioned in this way is embedded in the housing 12 in such a way that the bushing 120 is aligned along a defined insertion axis a toward the receiving region 130.

On the one hand, when the pin 11 is inserted from the housing exterior, the bushing 120 acts as a guide of the pin 11 along the insertion axis a. In this case, in the embodiment shown in FIG. 1, the bushing 120 is configured in such a way that the insertion axis a extends orthogonally to the outer surface of the housing 12. On the other hand, when the pin 11 is inserted, the bushing 120 structurally forms an end stop such that the end pin 111 of the pin 11 forcibly terminates in the receiving region 130 of the cup 13 in the inserted state. In addition, a sealing ring 114, which is provided in FIG. 1 at the level of the bushing 120 in a radially circumferential groove on the pin 11, guarantees the fluid sealing of the bushing 120.

In order for the bushing 120 to be aligned with the receiving region 130 after the cup 13 has been inserted into the housing 12, the housing interior and the cup 13 have to be adapted to one another structurally, for example by means of corresponding guides or corresponding end stops (not shown in detail in FIG. 1). Any component tolerances on the housing 12 or on the cup 13 can, however, cause the bushing 120 and the receiving region 130 to not be ideally aligned with one another along the insertion axis a, but rather marginally displaced or tilted relative to one another.

In order to allow the insertion of the pin 11 and electrical contacting even under these circumstances, a sleeve 14 is arranged as an electrically conductive spring element in the receiving region 130 of the cup 130, which sleeve encloses the end pin 111 of the pin 11 radially in the receiving region 130 with respect to the insertion axis a. The sleeve 14 can, for example, be fastened or electrically contacted via a corresponding external thread in the receiving region 130 of the cup 13. Thus, when the pin 11 is inserted through the housing bushing 120, the end pin 111 is inserted into the sleeve 14. This ensures the grounding or electrical contacting of the cup 13 to the outside, so that the insertion connection, for example, withstands a corresponding "burst test" according to IEC/EN 61000-4-4 or a "surge test" according to IEC/EN 61000-4-5.

In order to resiliently enclose the pin 11 or the end pin 11 radially, the sleeve 14 has at least three internal axially aligned lamellae 140. With regard to elastic deformability, it is optimal to make the sleeve 14 or the lamellae 140 from a copper-beryllium alloy. As a result of the radially resilient action of the lamellae 140, tilting is thus prevented when the pin 11 is inserted. Instead of the sleeve 14 shown in FIG. 1, it is alternatively also possible to use an annular spring or a wave spring as a spring element. In addition, it is conceivable to provide the sleeve 14 with a gold coating in order to improve the electrical conductivity between the pin 11 and the receiving region 130.

In the embodiment shown in FIG. 1, the pin 11 is secured against being pulled out by a securing element 112. For this purpose, the pin 11 has a bushing 113 corresponding to the securing element 112 between the receiving region 130 and the housing bushing 120 with respect to the insertion axis a. The orthogonal orientation of the cotter pin bushing 113 in conjunction with the at least one-sided protrusion of the securing element 112 beyond the diameter of the pin 11 thus prevents axial displacement of the pin 11.

The invention claimed is:

1. A field device, comprising:

an electrical pin having a cable connection and an end pin opposite the cable connection;

a device housing having a bushing into which the electrical pin can be inserted along an insertion axis;

a cup made of an electrically conductive material that can be arranged in the housing and having a receiving region that is aligned with the bushing with respect to the insertion axis such that the end pin of the electrical pin terminates in the receiving region; and an electrically conductive spring configured to resiliently enclose the end pin in the receiving region radially with respect to the insertion axis such that the electrical pin is electrically contacted with the cup, wherein the housing is made of an electrically insulating material.

2. The field device according to claim 1, wherein the spring is configured as an annular spring or wave spring corresponding to the end pin.

3. The field device according to claim 1, wherein the spring includes a gold coating.

4. The field device according to claim 1, wherein the cup is designed as a Faraday cage for electronic components.

5. The field device according to claim 1, wherein the housing forms an end stop for the electrical pin with respect to the insertion axis such that the end pin of the electrical pin terminates in the receiving region or in the spring element.

6. The field device according to claim 1, further comprising:

a securing element; and a bushing in the electrical pin corresponding to the securing element and extending orthogonally to the insertion axis such that the securing element axially secures the electrical pin against pulling out.

7. The field device according to claim 1, wherein the spring is configured as a sleeve corresponding to the end pin and has at least three inner lamellae that are arranged axially with respect to the insertion axis.

8. The field device according to claim 7, wherein the sleeve is made of copper, a copper-beryllium alloy, or brass.

9. A method for manufacturing a field device, the field device, including:

an electrical pin, having a cable connection and an end pin opposite the cable connection;

a device housing having a bushing into which the electrical pin can be inserted along an insertion axis;

a cup made of an electrically conductive material that can be arranged in the housing and having a receiving region that is aligned with the bushing with respect to the insertion axis such that the end pin of the electrical pin terminates in the receiving region, and an electrically conductive spring configured to resiliently enclose the end pin in the receiving region radially with respect to the insertion axis such that the electrical pin is electrically contacted with the cup, wherein the housing is made of an electrically insulating material, the method comprising:

inserting the spring element into the receiving region of the cup;

inserting the cup into the housing such that the receiving region or the spring element is aligned with the bushing with respect to the insertion axis; and inserting the electrical pin into the bushing from an outer side of the housing remote from the cup such that the end pin is radially resiliently enclosed by the spring element with respect to the insertion axis and such that the electrical pin is electrically contacted with the cup.

10. The method according to claim 9, further comprising:

axially securing the electrical pin against pulling out by inserting a cotter pin into a cotter pin bushing.

* * * * *